Nov. 12, 1929.   J. L. NEEL   1,735,355
FOOD DISPENSING DEVICE
Filed April 14, 1928   2 Sheets-Sheet 1

INVENTOR
James L. Neel
BY
J. Wm. Ellis
ATTORNEY

Nov. 12, 1929.  J. L. NEEL  1,735,355
FOOD DISPENSING DEVICE
Filed April 14, 1928  2 Sheets-Sheet 2
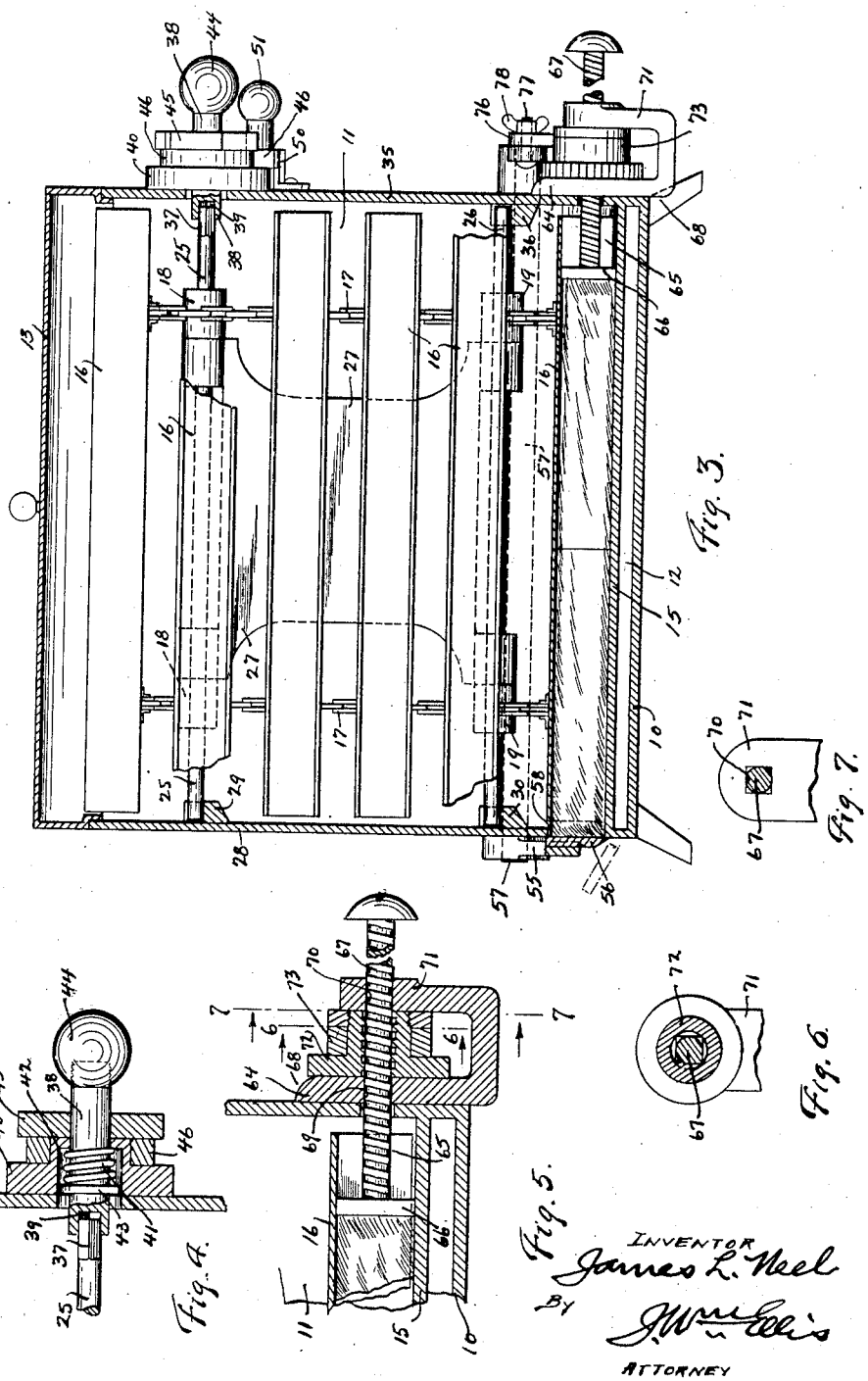

Patented Nov. 12, 1929

1,735,355

UNITED STATES PATENT OFFICE

JAMES L. NEEL, OF PERRY, NEW YORK

FOOD-DISPENSING DEVICE

Application filed April 14, 1928. Serial No. 270,077.

My invention relates in general to a device for dispensing food and in particular to a device whereby butter may be dispensed by cutting it into pieces of predetermined thickness.

The principal object of my invention has been to provide a device of this nature which shall be sanitary, and in which the food may be kept cool.

Another object has been to provide a device by which pieces of butter or other food may be cut to uniform thickness without having the same touched by the human hand.

Moreover, my device is provided with feeding means which may be easily regulated, and which is operated by means of the food cutting knife.

Furthermore, my device is provided with a plurality of receptacles so that when once charged with food, it may be operated for considerable time without requiring attention.

The above objects and advantages have been accomplished by the device shown in the accompanying drawings, of which:

Fig. 3 is a longitudinal, sectional view of the device with portions thereof broken away.

Fig. 4 is an enlarged, longitudinal, sectional view, taken on line 4—4 of Fig. 2.

Fig. 5 is a similar view taken on line 5—5 of Fig. 2.

Fig. 6 is a transverse, sectional view, taken on line 6—6 of Fig. 5.

Fig. 7 is a transverse, sectional view, taken on line 7—7 of Fig. 5.

Figure 1:
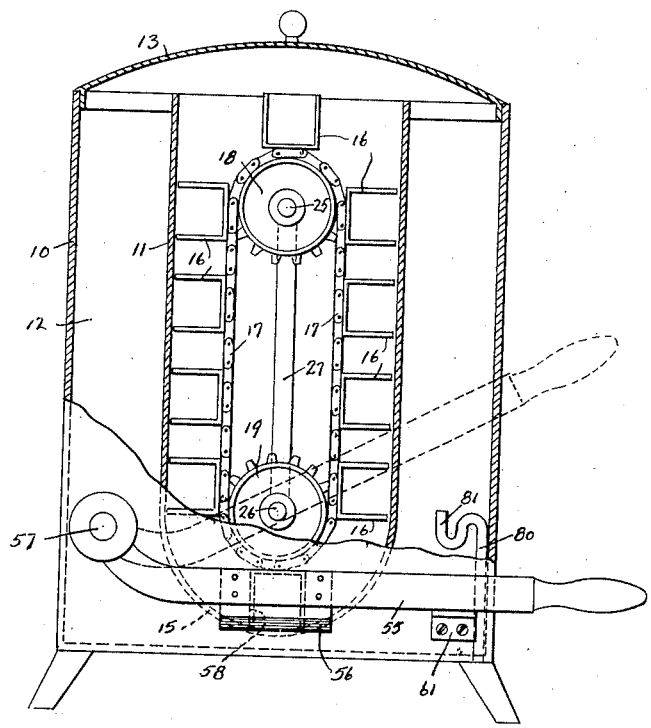
Fig. 1 is a front end view, partly in section.

The device comprises an outer casing 10 and an inner casing 11. These casings are interspaced whereby a cooling compartment 12 is formed. The cover 13 is provided for the casing whereby the top is efficiently closed.

The inner casing 11 is provided with a curve-shaped bottom 15 and is open at its upper end. Mounted in the inner casing are the food receptacles 16. Each of these receptacles is of a shape corresponding to the shape of the food being dispensed, and for clearance in the drawings, I have shown the device designed for dispensing butter, which, as is well known, is to be had in bars or cakes of the desired cross-section. In Figs. 3 and 5 I have shown such bars in position in the machine. It may be necessary to place one or more such cakes or bars of butter in the receptacle in order to fill the same and the receptacles are therefore made of a length to accommodate one, two, or more of such cakes or bars. The receptacles are attached at each end to a sprocket chain 17, which chains pass over suitable sprockets 18 and 19. The sprockets 18 are carried by an upper shaft 25, and the sprockets 19 are carried by a lower shaft 26. The shafts 25 and 26 are rotatably mounted in a supporting bracket or frame 27, whereby the sprockets, shafts, and receptacles are held together as a unit. The forward wall 28 of the device is provided with bearings 29 and 30 for the reception, respectively, of the forward ends of the shafts 25 and 26. The rear head 35 of the device is provided with a bearing 36 for the rear end of the shaft 26. The bearings 29, 30 and 36 are merely for the support of the ends of the shafts and are U-shaped in form and open at their upper sides so that the shafts with the other unit parts may be lifted out of the inner casing as a unit.

The rear end of the shaft 25 is provided with a square-shaped portion 37. A plunger 38 is carried by the rear wall 35 of the device and is provided in its forward end with a square-shaped aperture 39 for engagement with the square-shaped end 37 of the shaft 25. This plunger is rotatably mounted in a bearing 40, and designed to have axial movement within the bearing against the tension of a helical spring 41, arranged within a recess 42 formed in the bearing. The plunger 38 is provided with a collar 43 against which the forward end of the helical spring 41 bears. The plunger is provided at its rear end with a knob 44, whereby it may be conveniently operated. Fixed to the plunger 38 is a ratchet wheel 45. Carried by the bearing 40 is an operating lever 46 which is provided with a ratchet pawl 47, engagable with the notches 48 of the wheel. The notches 48 are so spaced that one or more operations of the lever 46 will cause the containers 16 to be moved the desired predetermined amount. A ratchet pawl spring 49 is carried by the lever 46, whereby the pawl is held in engagement with the ratchet wheel 45. A stop 50 serves to hold the lever 46 in place and act as a stop for its downward movement. An operating knob 51 is provided on the outer end of the lever 46.

Arranged in front of the front wall 28 is the slicing lever 55 which carries a knife 56. This lever is mounted upon a feed shaft 57 which extends through the device and projects at the rear of the machine beyond the rear wall 35. The front wall is provided opposite the knife 56 with an opening 58 through which the butter is projected by the feeding mechanism, hereinafter described. A stop 61 is carried by the front wall 28, and it limits the downward movement of the slicing lever 55. The notches on the ratchet wheel 45 and the position of the stop 50 for the lever 46 are such that the containers 16 will be brought one at a time in position directly opposite the opening 58 so that the contents thereof may be projected through the opening by the feeding mechanism.

Carried by the rearwardly projecting end of the said shaft 57 is a feed lever 59. This lever is provided with a slot 60 for purposes to be hereinafter described. Carried by the rear wall 35 and arranged opposite the container which is in register with the opening 58 in the front wall is a feed plunger 65 having a plunger head 66 and a stem 67. The stem is square in general cross-section, and provided with fragmentary screw-thread portions at the corners, as shown in Figs. 6 and 7. The square portion of the stem passes through a square-shaped aperture 69 formed in the base 64 of a bracket 68 and also through a square-shaped aperture 70 formed in the interspaced arm 71 of the bracket. Such engagement with the square-shaped contour of the stem prevents the same from relative rotation within the bracket 68. Mounted between the base 64 and the interspaced arm 71 is a ratchet wheel 72 which is provided with a threaded central aperture for engagement with the corners of the threads formed on the stem 67, whereby when the ratchet wheel 72 is rotated the stem will be caused to move axially within the bracket 68. Mounted upon the ratchet wheel 72 is a ratchet lever 73 having a suitable pawl 74 engageable with the ratchet wheel. The ratchet lever 73 is provided at its outer end with a slot 75, and a link 76 connects the slotted end of the feed lever 59 with the ratchet lever 72. Suitable bolts 77 are provided at each end of the link for engagement with the slots of the levers, and wing nuts 78 are provided on the bolts for ready adjustment.

A drain pipe 80 is provided for the outer casing, and a trap 81 is preferably carried at the upper end of the drain pipe, whereby the water forming in the bottom of the casing as a result of the melting ice contained in the space 12 will be permitted to pass out of the casing, and relatively warm air will be also prevented from entering the casing.

As shown in Fig. 1, the inner casing 11 lies in close proximity of the edges of the food containers 16 which lie in a vertical plane, and the lower curve-shaped bottom 15 of the casing follows substantially the path described by one of the containers as it is moved from a position occupied on the vertical stretch of the chain to the lower dispensing position.

Figure 2:
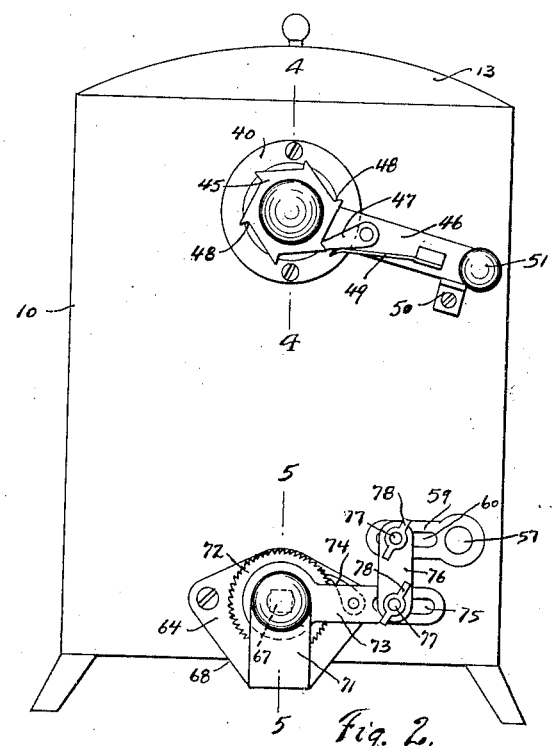
Fig. 2 is a rear end elevation.

When the device is to be used, the containers are filled with bars or cakes of butter, the loading operation occurring when the machine is assembled, or if desired when the receiving unit is removed from the machine. If loaded when the receiving unit is removed from the machine, the lowermost receiver 16 cannot, of course, be filled with butter. After the unit is loaded and is in position within the machine, a loaded receiver is moved to the lowermost point on the chain, or to a point where it will be opposite the dispensing opening 58 and in register with the discharge plunger 65. Such movement of the chain is, of course, brought about by the actuation of the lever 46 and ratchet wheel 45. The slicing lever is now moved up and down, which, through the medium of the shaft 57, levers 59 and 73, and link 76 will cause the rotation of the ratchet wheel 72. The rotation of this wheel will cause the stem 67 of the plunger 65 to be moved through the base 64 and arm 71 of the bracket 68 and bring the plunger 66 up against the end of the bar or cake of butter or other food. The slicing lever is now moved the predetermined distance for which the machine has previously been set, which will cause the butter to be pushed out of the dispensing opening 58 a distance equal to the desired thickness of the slice of butter. The slicing lever 55 is now moved downwardly to the stop 61 which will cause the knife 56 to sever the piece of butter from the bar and to drop it into a suitable receptacle (not shown). The slicing knife is operated to dispense the food as needed until the plunger 66 of the feeding mechanism has reached the forward end of the receiver and until the last piece of butter has been dispensed from this receiver. The plunger 65 is now returned to its rearward position by manually rotating the ratchet wheel 72 in a clockwise direction as viewed in Fig. 2. During such rotation, the ratchet pawl may be raised out of engagement with the teeth of the ratchet wheel. When the feeding mechanism has been returned to its initial position, the operating lever 46 is again operated which will cause the rotation of the ratchet wheel 45 and hence the rotation of the shaft 25. The rotation of the shaft 25 will cause the rotation of the shaft 26 and the movement of the containers of the unit. The ratchet wheel 45 is operated a predetermined distance or until the next container 16 is in registering position with the dispensing opening 58 and the feeding mechanism, whereupon the feeding mechanism will again be operated by means of the slicing lever 55 as it is being operated in the slicing and dispensing of the butter.

It is obvious that the thickness of the slice of food cut from the cake or bar in the container is governed by the amount of movement of the lever 73, and the ratchet wheel 72. This amount of movement may be controlled by the position of the link 76 which connects the lever 73 with the feed lever 59.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A food dispensing machine comprising a casing, interspaced shafts mounted for rotation within the casing, sprocket wheels carried by the shafts, chains connecting the sprocket wheels, a plurality of food containers carried by the sprocket chains and movable within the casing, and means for causing a predetermined amount of movement of the sprocket chains, whereby the food containers may be brought into operative position one at a time.

2. A food dispensing machine comprising a casing, interspaced shafts mounted for rotation within the casing, sprocket wheels carried by the shafts, chains connecting the sprocket wheels, a plurality of food containers carried by the sprocket chains and movable within the casing, means for causing a predetermined amount of movement of the sprocket chains, the front of the casing being formed with a dispensing opening, a slicing knife operating in front of the opening, feeding mechanism arranged in registering position with the container which is in front of the opening, and means for operating the feeding mechanism a predetermined amount each time the slicing knife is operated.

3. A food dispensing machine comprising a casing, interspaced shafts mounted for rotation within the casing, sprocket wheels carried by the shafts, chains connecting the sprocket wheels, a plurality of food containers carried by the sprocket chains and movable within the casing, means for causing a predetermined amount of movement of the sprocket chains, comprising a plunger carried by the casing and connected with one of the shafts, and ratchet means for causing the predetermined rotation of the plunger.

4. A food dispensing machine comprising a casing, interspaced shafts mounted for rotation within the casing, a bracket carried by the shafts for keeping them at a predetermined distance, sprocket wheels carried by the shafts, chains connecting the sprocket wheels, a plurality of food containers carried by the sprocket chains and movable within the casing, U-shaped bearings carried by the casing for supporting both ends of the lower shaft and the forward end of the upper shaft, a spring-pressed plunger carried at the rear of the casing for non-rotative engagement with the rear end of the upper shaft, and ratchet means carried by the plunger for causing the rotation thereof, whereby the containers will be moved a predetermined amount.

5. A food dispensing machine comprising a casing, interspaced shafts mounted for rotation within the casing, sprocket wheels carried by the shafts, chains connecting the sprocket wheels, a plurality of food containers carried by the sprocket chains and movable within the casing, means for causing a predetermined amount of movement of the sprocket chains, a feed shaft carried by the casing, the front of the casing being formed with a dispensing opening, a slicing knife mounted in the forward end of the feed shaft and operating in front of the opening, a feed lever mounted on the rear end of the shaft, and feeding mechanism connected with the feed lever and arranged in registering position with the container which is in front of the opening.

In testimony whereof, I have hereunto signed my name.

JAMES L. NEEL.